United States Patent
Sato

(10) Patent No.: US 7,623,291 B2
(45) Date of Patent: Nov. 24, 2009

(54) POLARIZED DIFFRACTIVE FILTER AND LAYERED POLARIZED DIFFRACTIVE FILTER

(75) Inventor: Hiromasa Sato, Koriyama (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 11/627,720

(22) Filed: Jan. 26, 2007

(65) Prior Publication Data

US 2007/0121210 A1  May 31, 2007

Related U.S. Application Data

(63) Continuation of application No. PCT/JP2005/013766, filed on Jul. 27, 2005.

(30) Foreign Application Priority Data

Jul. 29, 2004  (JP)  ............... 2004-221265

(51) Int. Cl.
  *G02B 5/18* (2006.01)
  *G02F 1/13* (2006.01)
(52) U.S. Cl. ............... 359/569; 349/201; 349/124
(58) Field of Classification Search ............... None
  See application file for complete search history.

(56) References Cited

U.S. PATENT DOCUMENTS

| 4,251,137 A | 2/1981 | Knop et al. |
| 4,729,640 A | 3/1988 | Sakata |
| 6,014,197 A * | 1/2000 | Hikmet ............... 349/201 |
| 6,891,147 B2 | 5/2005 | Goto et al. |
| 7,079,202 B2 | 7/2006 | Ooi et al. |
| 7,142,363 B2 | 11/2006 | Sato et al. |
| 2004/0169929 A1 | 9/2004 | Sato et al. |
| 2006/0033913 A1 | 2/2006 | Sato et al. |
| 2006/0103778 A1 | 5/2006 | Ooi et al. |
| 2006/0193235 A1 | 8/2006 | Murata et al. |
| 2006/0239171 A1 | 10/2006 | Ooi et al. |

(Continued)

FOREIGN PATENT DOCUMENTS

JP  61-86727 A  5/1986

(Continued)

OTHER PUBLICATIONS

U.S. Appl. No. 11/627,720, filed Jan. 26, 2007, Sato.

(Continued)

*Primary Examiner*—Joshua L. Pritchettf
(74) *Attorney, Agent, or Firm*—Oblon, Spivak, McClelland, Maier & Neustadt, L.L.P.

(57) ABSTRACT

A polarized diffractive filter contains cyclic concave/convex portions formed as a diffractive grating on a transparent substrate. The concave portions are filled with an optical material. At least one member selected from the group consisting of i) a material constituting the concave/convex portions, and ii) the optical material filled in the concave portions contains a liquid crystal material. The diffractive grating contains an isotropic material, the isotropic material having a refractive index outside a range from an extraordinary index to an ordinary index of the liquid crystal material. The polarized diffractive filter is capable of receiving light having at least two different peak wavelengths so as to shield light of at least one of the peak wavelengths by diffraction and to transmit the light of the other peak wavelengths.

14 Claims, 4 Drawing Sheets

U.S. PATENT DOCUMENTS

| | | |
|---|---|---|
| 2007/0121210 A1 | 5/2007 | Sato |
| 2008/0030632 A1 | 2/2008 | Murata |

FOREIGN PATENT DOCUMENTS

| | | |
|---|---|---|
| JP | 8-278477 A | 10/1996 |
| JP | 10-68820 A | 3/1998 |
| JP | 2000-348366 | 12/2000 |
| WO | WO 96/27148 | 9/1996 |

OTHER PUBLICATIONS

U.S. Appl. No. 12/139,827, filed Jun. 16, 2008, Koyanagi et al.
Machine Translation of JP 08-278477 dated Oct. 22, 1996, 26 pages.
Translation of drawing legends for JP 08-278477 dated Oct. 22, 1996, 2 pages.

* cited by examiner

POLARIZED DIFFRACTIVE FILTER AND LAYERED POLARIZED DIFFRACTIVE FILTER

TECHNICAL FIELD

The present invention relates to a polarized diffractive filter capable of changing the wavelength of transmitting light in use in combination with a polarizing element such as polarizer, optical rotor, phase shifter or the like and a layered polarized diffractive filter comprising such polarized diffractive filters layered.

BACKGROUND ART

A dielectric multilayer filter, a color filter with dispersed colorant or the like is widely employed as a filter transmitting selectively a specified wavelength. As means for performing easier the same function as such, a wavelength-selective filter with a diffractive grating is proposed. The wavelength-selective filter comprises cyclic concave/convex portions formed on a transparent substrate. This wavelength selective filter can provide high transmission characteristics with respect to a specified wavelength when the phase difference of incident light to a concave portion and a convex portion of the filter is an integral multiple of the specific wavelength.

Further, a diffractive dichloric filter (wavelength-selective filter) utilizing this technique is disclosed in, for example, JP-A-2000-348366. In the diffractive dichloric filter of this patent document, an optical head device comprising two kinds of semiconductor lasers as light sources which emit wavelengths of 660 nm and 790 nm, is used wherein when the phase difference of incident light produced by the steps of concave and convex is about two time as much as 660 nm, light having a wavelength of 660 nm is transmitted and light having a wavelength of 790 nm is shielded by diffraction (hereinbelow, referred to as "diffraction-shield"), hence, it functions as the diffraction-shielding filter.

DISCLOSURE OF THE INVENTION

Problems to be Solved by the Invention

In the above-mentioned diffractive filter, however, wavelengths to be transmitted and diffracted are determined primarily by the phase difference determined by the depth of the diffractive grating, and accordingly, the wavelength to be transmitted can not be changed to another as desired. Further, in the dielectric multilayer filter and the color filter with dispersed colorant too, the wavelength to be transmitted is fixed and it is impossible to transmit light by changing the wavelength to a desired wavelength.

In such diffractive filter, light having a specified wavelength diffraction-shielded by the filter and light having a wavelength transmitted are separated with a diffraction angle θ determined by:

$$\sin \theta = \lambda/P$$

where λ is a wavelength of light to be diffracted and P is a cycle of concave/convex portions of the diffractive grating.

Accordingly, when the separation angle by diffraction is to be kept sufficiently large, the cycle of the grating should be made smaller. However, when the cycle of the grating is made smaller, there is a problem that the transmittance of light having a wavelength to be transmitted decreases.

The present invention has been achieved in consideration of the above-mentioned circumstances and to provide a polarized diffractive filter having a high transmittance and diffraction-shielding performance and being capable of changing the wavelength to be transmitted.

MEANS FOR SOLVING THE PROBLEMS

The features of the present invention are disclosed below.

1. There is provided a polarized diffractive filter capable of receiving light having at least two different peak wavelengths so as to shield light of at least one of the peak wavelengths by diffraction and to transmit the light of the other peak wavelengths, the polarized diffractive filter being characterized in that cyclic concave/convex portions are formed as a diffractive grating on a transparent substrate; the concave portions are filled with an optical member and at least one of the member constituting the concave/convex portions and the optical member filled in the concave potions contains a liquid crystal material.

According to the above-mentioned construction, since the cyclic concave/convex portions are formed on a transparent substrate, and a part of a material constituting the convex portions or a part of a material filled in the concave portions is composed of a liquid crystal material having a birefringence, it is possible to change the wavelength to be transmitted.

2. The polarized diffractive filter according to the above-mentioned 1, wherein the directions of alignment of axis of liquid crystal molecules indicating an extraordinary index of the liquid crystal material are parallel to a longitudinal direction of the diffractive grating in the vicinity of the diffractive grating.

According to the above-mentioned construction, since the direction of alignment of axis indicating the extraordinary index of the liquid crystal material is aligned to a longitudinal direction of the grating, it is possible to utilize the alignment-controlling performance of wall surfaces of the grating to the liquid crystal material in order to align the liquid crystal molecules.

3. The polarized diffractive filter according to the above-mentioned 1 or 2, wherein the concave/convex portions constituting the diffractive grating are made of a thin film formed on the transparent substrate.

According to the above-mentioned construction, since the concave/convex portions of the diffraction grating are made of a thin film formed on the transparent substrate, a material having an arbitrary refractive index different from that of the transparent substrate can be used whereby options in selecting the optical member can be expanded.

4. A layered polarized diffractive filter comprising a pair of polarized diffractive filters, each defined in the above-mentioned 1, 2 or 3, layered so that the diffractive gratings oppose to each other, wherein the optical member contains a liquid crystal material and is filled between the opposing diffractive gratings, and the opposing diffractive gratings are disposed so that longitudinal directions of the grating intersect orthogonally each other.

According to the above-mentioned construction, since the two diffractive gratings are disposed so that the longitudinal directions of the grating intersect orthogonally, the diffracted light produced when light is incident into a first diffractive grating is further diffracted by a second diffractive grating whereby the diffracted light from the second diffractive grating propagates in a direction different from the transmitting light. Thus, by employing the two polarized diffractive filters, it is possible to control the transmittance of the wavelength to be shielded, whereby the extinction ratio of the wavelength to be shielded to the wavelength to be transmitted can be increased.

5. The layered polarized diffractive filter according to the above-mentioned 4, wherein the optical member is disposed so that the directions of alignment of axis of liquid crystal molecules indicating an extraordinary index of the liquid crystal material contained in the optical member are rotated by 90° around the direction perpendicular to the transparent substrate surface.

According to the above-mentioned construction, since the liquid crystal between the diffractive gratings serves as an optical rotor, the polarization characteristics of the two diffractive gratings intersecting orthogonally are substantially equal whereby the multilayered structure improves the extinction ratio and it is possible to control adverse effect of diffracted stray light.

6. The layered polarized diffractive filter according to the above-mentioned 4 or 5, wherein a transparent conductive film is formed at least in concave portions of the diffractive gratings so as to activate the liquid crystal material by applying a voltage in a direction perpendicular to the transparent substrate or a direction orthogonal to longitudinal directions of the diffractive gratings.

According to the above-mentioned construction, it is possible to provide a diffractive filter capable of changing the wavelength to be transmitted, since the filter has an element for changing the polarization by activating the liquid crystal with a voltage applied to the build-in electrode. In particular, when a voltage is applied in a direction perpendicular to a longitudinal direction of the grating of the diffractive grating, i.e., in a direction in parallel to the direction of diffraction of the diffractive grating, the aligned axis indicating an extraordinary index of the liquid crystal material is changed in an in-plane area whereby it is possible to select the wavelength to be transmitted in a non-voltage application time.

7. A layered polarized diffractive filter comprising a first polarized diffractive filter and a second polarized diffractive filter layered, wherein each of the first and second polarized diffractive filters is the polarized diffractive filter defined in the above-mentioned 1, 2 or 3, and with respect to a first linear polarized light and a second linear polarized light which have polarization directions intersecting orthogonally each other, the first polarized diffractive filter transmits almost all the first linear polarized light and diffracts the second linear polarized light while the second polarized diffractive filter diffracts the first linear polarize light and transmits almost all the second linear polarized light.

According to the above-mentioned construction, since the diffractive filter effective only to either one of linear polarizations intersecting orthogonally is installed, all polarizations of incident light can be utilized, hence, utilization efficiency can be increased.

8. A layered polarized diffractive filter comprising a first polarized diffractive filter and a second polarized diffractive filter layered, wherein each of the is first and second polarized diffractive filters is the polarized diffractive filter defined in the above-mentioned 1, 2 or 3, the phase difference provided by the first polarized diffractive filter with respect to light of peak wavelength is about two times as much as the phase difference provided by the second polarized diffractive filter with respect to the light of peak wavelength.

According to the above-mentioned construction, the full width at half-maximum value can be made smaller with respect to the wavelength dependence to the intensity of light to be transmitted.

When any of the above-mentioned diffractive filters is used as a component part, an optical head device or an image processing device being inexpensive and having flexibility in designing can be provided.

EFFECTS OF THE INVENTION

In the present invention, since at least a part of the cyclic concave/convex portions formed on a transparent substrate and a filling member filled in concave portions of the concave/convex portions is composed of a liquid crystal material having birefringence, it is possible to change the peak wavelength to be transmitted.

MEANINGS OF SYMBOLS

10, 20, 30, 40: Layered polarized diffractive filter
11, 13, 21, 23, 31, 33, 41, 43: Transparent substrate
12, 22, 24, 32, 34, 42, 44: Diffractive grating
14, 25, 35, 45: Transparent conductive film
15, 26, 36, 46: Liquid crystal

BEST MODE FOR CARRYING OUT THE INVENTION

In the following, some embodiments of the present invention will be described in detail with reference to attached drawings. In description, a peak wavelength is referred simply as "wavelength". Here, the peak wavelength means the wavelength indicating a peak in a wavelength dispersion spectrum.

In the following description, a layered polarized diffractive filter formed by layering polarized diffractive filters so as to oppose their diffractive gratings, is intended.

FIRST EMBODIMENT

Figure 1:
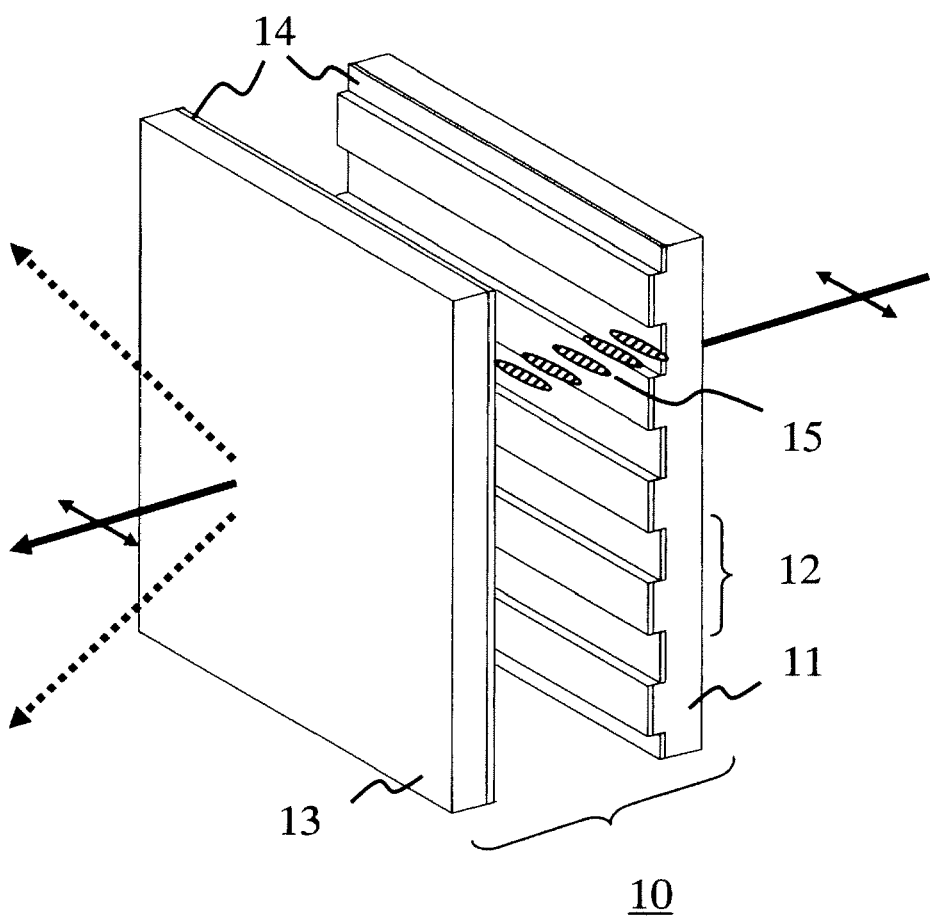
FIG. 1: A perspective view showing a constitutional example of the layered polarized diffractive filter element according to a first embodiment of the present invention

FIG. 1 is a perspective view of a layered polarized diffractive filter 10 according to a first embodiment of the present invention. The layered polarized diffractive filter 10 comprises a transparent substrate 11 made of e.g. glass having a refractive index of $n_s$ on which a diffractive grating 12 having cyclic concave/convex portions of depth d is formed. On the diffractive grating 12, a thin film of, e.g., ITO is formed as a transparent conductive film 14. The filter also has an opposing transparent substrate 13 having a surface on which a transparent conductive film 14 of ITO is also formed. On each single surface of transparent substrates 11, 13, an aligning film (not shown) is formed. The aligning film is subjected to an aligning treatment in a direction parallel to a longitudinal direction of the grating of the diffractive grating 12, in other words, in a direction perpendicular to the direction of diffraction of the diffractive grating. As described later, a liquid crystal material (liquid crystal) 15 is filled in the space between the transparent substrates 11, 13 at the side of opposing the transparent conductive films 14 to thereby constitute a liquid crystal cell.

Description will be made as to a method for manufacturing the layered polarized diffractive filter 10 of this embodiment.

(1) First, a transparent substrate 11 of, e.g., glass having a refractive index $n_s$ is prepared. With a photolithography process, a diffractive grating 12 having cyclic concave/convex portions of depth d is formed in a single surface.

The diffractive grating 12 of this embodiment may be formed by processing directly the transparent substrate 11 or may be formed by processing an inorganic film or an organic film formed on the transparent substrate 11. The refractive index of a material for the diffractive grating 12 is preferably out of the range from the extraordinary index $n_e$ to the ordinary index $n_o$ of a liquid crystal material used when the diffractive grating is made of a single material, because if diffractive indices of both members coincide with each other at an intermediate voltage, diffraction will not occur. In particular, the material for the diffractive grating has preferably a higher refractive index than the extraordinary index $n_e$ or a lower refractive index than the ordinary index $n_o$. However, when a material having a refractive index sufficiently apart from the refractive index of the liquid crystal material is used for the diffractive grating, the depth of the grating can preferably be reduced.

As a material having a high refractive index, $TiO_2$, $Ta_2O_5$, $Nb_2O_5$ or the like may be employed. As a material having a low refractive index, other than $SiO_2$, $MgF_2$ or the like, a material having an effectively low refractive index by forming sufficiently small holes with respect to wavelengths may be employed. In order to prevent the reduction of the transmittance due to loss of interfacial reflection (Fresnel reflection) which is resulted from a difference of refractive indices on the transparent substrate 11 used, it is preferably to use a material of low refractive index.

The material (member) for the diffractive grating 12 is not necessarily be a single material with uniform refractive index but may be composed of a plurality of materials. For example, the phase produced due to a refractive index difference may be divided into a fixed portion and a variable portion, wherein as the fixed portion, a combination of a high refractive index material and a low refractive index material by which a larger refractive index difference is produced, is used to produce a predetermined phase, while as the variable portion, a combination of a liquid crystal material and a material of an intermediate refractive index is used.

In this case, flexibility in determining a variable range of phase by activating the liquid crystal can preferably be increased. Further, a dielectric multilayer film may be used as the material for the grating. Or wavelength dependence such as transmittance, effective refractive index or the like can be optimized by designing properly the layered structure.

The material for the grating may be liquid crystalline polymer having birefringence which is formed by processing. In this case, the concave portions of the grating may be filled with an optical member selected from various kinds of isotropic material from a low refractive index material including air to a high refractive index material. Further, by filling liquid crystal having birefringence in the concave portions of the grating, the structure in which the birefringence material is used for both the convex portions and the concave portions can be provided.

When the grating is formed using the same material as that formed on the transparent substrate 11, the transparent conductive film 14 which serves as a transparent electrode can be formed on both a lower portion (bottom surface) and an upper portion (upper surface) of the concave/convex portions as the grating. However, for the purpose of preventing reduction in an applicable voltage due to the material constituting the convex portions of the grating, the electrode should be formed only on the uppermost surfaces and bottom surfaces of the grating, i.e., only on the surface of the concave/convex portions because there causes less reduction in a voltage applied to the liquid crystal and less variation in phase in the uniform liquid crystal layer sandwiched between the transparent substrates.

Further, when the grating is formed using the same material as that formed on the transparent substrate 11, the transparent conductive film 14 which serves as the transparent electrode can be disposed uniformly under the thin film constituting the grating, as expressed in the above with the terms of the lower portion of the concave/convex portions. When the thickness of the uniform liquid crystal layer sandwiched between the transparent substrates is sufficiently large and the grating influences little for the voltage drop in the uniform liquid crystal layer, the uniformity of an applicable voltage is high and process for manufacturing becomes simple.

(2) Then, aligning films (not shown) are formed on the surface of the transparent substrate 11 at a side of the diffractive grating 12 and the surface of the transparent substrate 13 at a side facing the diffractive grating 12 respectively. An aligning treatment is conducted to the aligning films in the direction parallel to a longitudinal direction of the grating of the diffractive grating 12, and the both transparent substrates 11 and 13 are bonded with a peripheral seal containing spacers (not shown) to keep a predetermined distance therebetween.

(3) Thereafter, a liquid crystal material 15 having an extraordinary index $n_e$ and an ordinary index $n_o$ ($n_s \neq n_e \neq n_o$) was injected in the space between the transparent substrates 11 and 13 to form a layered polarized diffractive filter 10 with liquid crystal. The liquid crystal material 15 may be of liquid crystal having polymerization groups in liquid crystal molecules so as to be polymerized by, e.g., the irradiation of a ultraviolet light. In this case, it is possible to change the wavelength to be transmitted or the wavelength to be diffracted to another wavelength by changing a polarization state by means of a phase shifter or an optical rotor which is disposed separately.

It is assumed that when no voltage is applied across the transparent conductive films 14, linear polarized light having a wavelength λ and being parallel to a longitudinal direction of the grating is incident into the layered polarized diffractive filter 10 of this embodiment. In this case, when the transparent substrate 11 has a refractive index $n_s$ and the liquid crystal material 15 has an extraordinary index $n_e$ parallel to the grating, the phase difference Φ determining the transmittance of transmitted light with respect to the linear polarized light incident into the interface of the cyclic concave/convex portions of the liquid crystal cell, is given by formula (1):

(Formula 1)

$$\Phi = 2\pi \cdot (n_e - n_s) \cdot d / \lambda \qquad (1)$$

where d is a depth of concave/convex portions.

On the other hand, when a rectangular a.c. voltage is applied to the transparent conductive films 14 to activate the liquid crystal, the extraordinary index $n_e$ with respect to the linear polarized light changes continuously toward the ordinary index $n_o$. Accordingly, the phase difference Φ determining the transmittance with respect to the incident linear polarized light can be changed continuously towards the phase difference Φ as shown in formula (2):

(Formula 2)

$$\Phi = 2\pi \cdot (n_o - n_s) \cdot d / \lambda \qquad (2)$$

By adjusting the voltage applied to the transparent conductive films 14, phase differences with respect to applied voltages $V_0$, $V_1$ and $V_2$ can be rendered to be $2\pi \cdot \lambda_1/\lambda$, $2\pi \cdot \lambda_2/\lambda$ and $2\pi \cdot \lambda_3/\lambda$ respectively, for example. Such diffractive grating serves as a layered polarized diffractive filter wherein according to applied voltages $V_0$, $V_1$ and $V_2$, transmitting wavelengths correspond to $\lambda_1$, $\lambda_2$ and $\lambda_3$ respectively. Further, it is possible to form a filter wherein according to variable voltages to be applied, wavelengths to be diffraction-shielded vary.

SECOND EMBODIMENT

Figure 2:
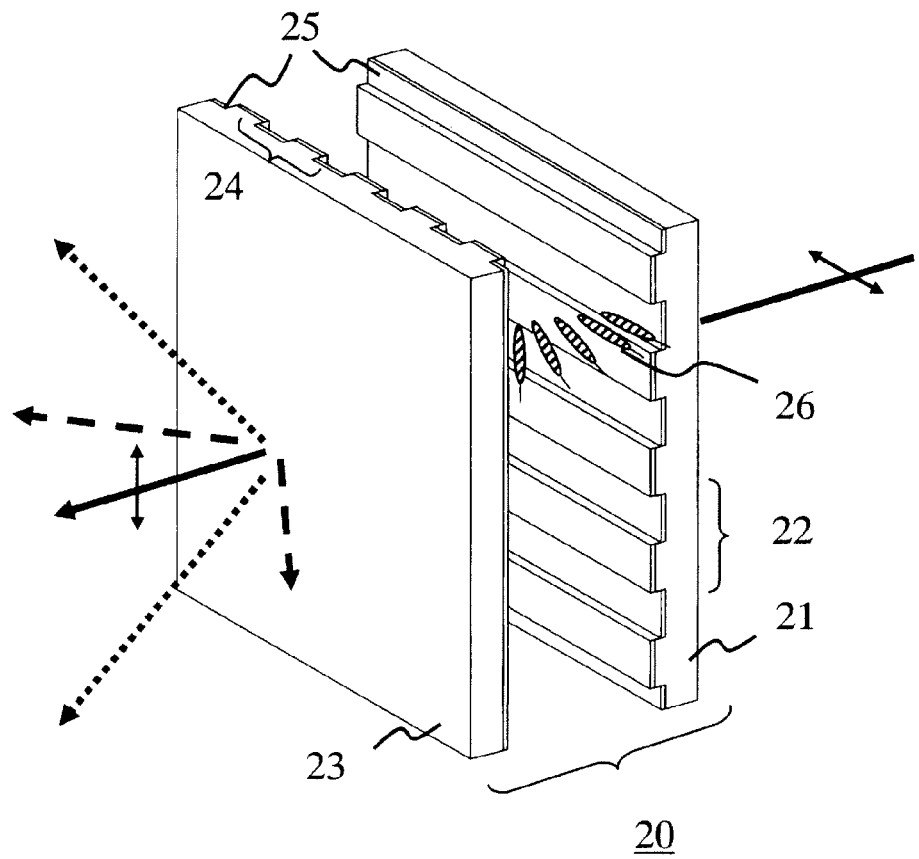
FIG. 2: A perspective view showing a constitutional example of the layered polarized diffractive filter element according to a second embodiment of the present invention

Next, description will be made with reference to FIG. 2 as to a layered polarized diffractive filter 20 according to a second embodiment of the present invention.

The layered polarized diffractive filter 20 is similar to the layered polarized diffractive filter 10 in the first embodiment of the present invention except that diffractive gratings 22, 24 are formed on opposing surfaces of transparent substrates 21, 23 respectively so that longitudinal directions of the gratings orthogonally intersect each other.

Namely, in the layered polarized diffractive filter 20 of this embodiment, the diffractive grating 24 of the same structure as the diffractive grating 22 on the transparent substrate 21 is also formed on the opposing transparent substrate 23. These diffractive gratings 22, 24 are subjected to an aligning treatment in a direction parallel to each grating in the same manner as the first embodiment whereby the liquid crystal has a substantially 90° twisted (rotated) structure. Therefore, the filter serves also as an optical rotor.

Here, the alignment of the liquid crystal means the alignment of liquid crystal molecules. This is applicable to further embodiments.

When no voltage is applied across two transparent conductive films 25 and when linear polarized light having a wavelength λ and being parallel to a longitudinal direction of a grating is used as incident light, the diffractive grating 22 on the transparent substrate 21 provides the same transmission characteristics as the first embodiment under the refractive index $n_s$ of the transparent substrate 21 and the extraordinary index $n_e$ parallel to a longitudinal direction of the grating of a liquid crystal material 26. Due to the twisted (rotated) structure of the liquid crystal disposed between the opposing transparent substrates 21, 23, the incident linear polarized light is rotated by about 90°. Accordingly, there appear in the diffractive grating 24 on the transparent substrate 23 the same transmission characteristics as the transparent substrate 21 under the transparent substrate 23 and the extraordinary index $n_e$ parallel to a longitudinal direction of the grating of the liquid crystal material 26.

This results as follows. In a case that for example, a voltage $V_0$ is applied across the transparent conductive films 25 in the first embodiment having a single diffractive grating 12, transmittances at this diffractive grating with respect to wavelengths $\lambda_1$, $\lambda_2$ and $\lambda_3$ are $T_1$, $T_2$ and $T_3$ ($T_1 > T_2 > T_3$) respectively. However, in the second embodiment, transmittances are $T_1^2$, $T_2^2$ and $T_3^2$ ($T_1^2 >> T_2^2 >> T_3^2$). Thus, the extinction ratio of light having a wavelength to be diffraction-shielded to light having a wavelength to be transmitted can be improved. When an applied voltage is sufficiently high, the direction of alignment of the liquid crystal is perpendicular to each transparent substrate 21 or 23 whereby there appear in both diffractive gratings 22, 24 transmission characteristics under the refractive indices $n_s$ of the transparent substrates 21, 23 and the ordinary index $n_o$ of the liquid crystal material to thereby increase the extinction ratio (in this case, however, the liquid crystal does not function as an optical rotor).

Figure 3:
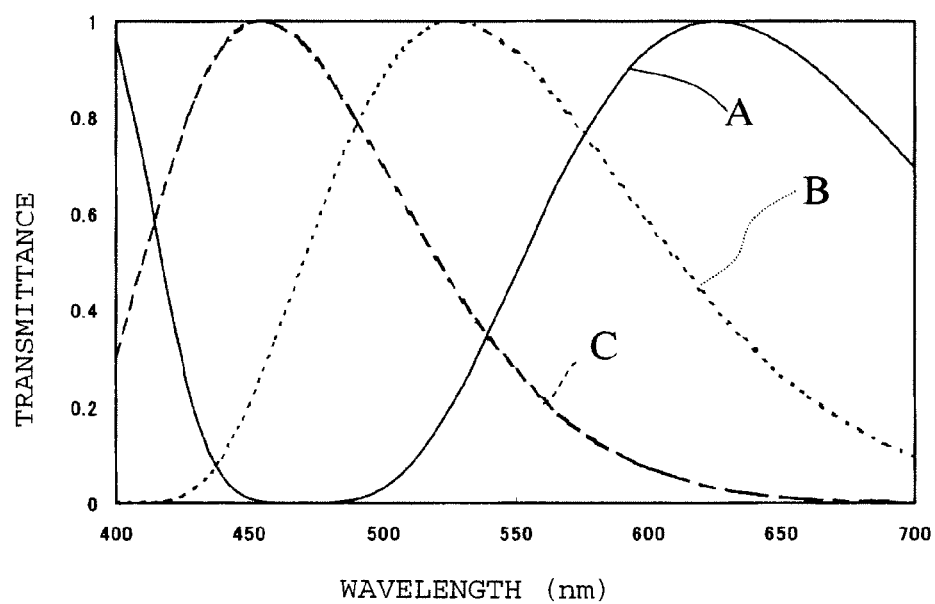
FIG. 3: A graph showing the transmission characteristics of the layered polarized diffractive filter of the present invention

FIG. 3 shows filtering characteristics of this embodiment. In FIG. 3, a solid line A indicates the transmittance when no voltage is applied, and a dotted line B and a broken line C indicate transmittances when voltages $V_1$ and $V_2$ ($V_1 < V_2$) are applied respectively. According to FIG. 3, it is understood that when an applied voltage is gradually increased, the wavelength to be transmitted shifts to a side of short wavelength.

THIRD EMBODIMENT

Figure 4:
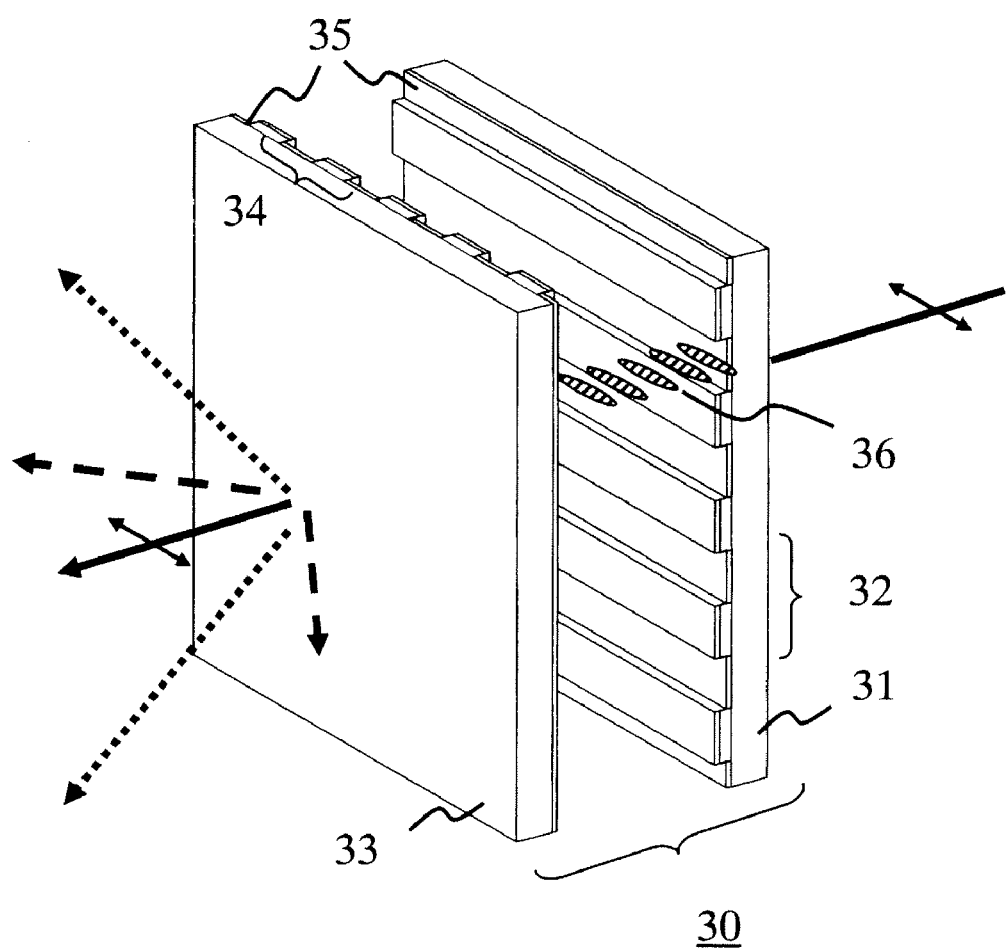
FIG. 4: A perspective view showing a constitutional example of the layered polarized diffractive filter element according to a third embodiment of the present invention

In the following, description will be made as to a layered polarized diffractive filter 30 according to a third embodiment of the present invention with reference to FIG. 4.

The layered polarized diffractive filter 30 of this embodiment is different from that of the second embodiment in the following points. The refractive index of a material constituting either diffractive grating 32 (or 34) is equal to the extraordinary index and the refractive index of a material of the other grating 34 (or 32) is equal to the ordinary index in the diffractive gratings 32, 34 each having cyclic concave/convex portions formed on transparent substrates 31, 33 respectively. Further, in this embodiment, the following point is different from the second embodiment. The direction of alignment of the liquid crystal 36 is parallel to a longitudinal direction of the grating of either diffractive grating 32 (or 34) and is perpendicular to the longitudinal direction of the grating of the other diffractive grating 34 (or 32).

Then, description will be made as to a method for producing the layered polarized diffractive filter 30 of this embodiment.

(1) First, an isotropic material having a refractive index substantially equal to the ordinary index $n_o$ of a liquid crystal material used is formed as a film on the transparent substrate 31, and a photolithography process is employed to the film to thereby form a first diffractive grating 32 made of the material having a refractive index substantially equal to the ordinary index $n_o$ of the liquid crystal material used and having cyclic concave/convex portions of depth d. On the other hand, an isotropic material having a refractive index substantially equal to the extraordinary index $n_e$ of a liquid crystal material used is formed as a film on the transparent substrate 33 to be opposed to the transparent substrate 31, and then, a second diffractive grating 34 made of the material having a refractive index substantially equal to the extraordinary index $n_e$ of the liquid crystal material used and having cyclic concave/convex portions of depth d, is formed.

(2) On the concave/convex portions of the both diffractive gratings 32, 34, transparent conductive films 35 are formed on opposing surfaces of the transparent substrates 31, 33 respectively in the same manner as the first and second embodiments. The diffractive grating 32 is subjected to an aligning treatment in a direction parallel to the direction of the grating, and the diffractive grating 34 on the opposing transparent substrate 33 is subjected to an aligning treatment in a direction perpendicular to the direction of the grating.

(3) In the same manner as the second embodiment, two opposed transparent substrates 31, 33 are bonded keeping a predetermined space therebetween in a state that the directions of the gratings intersect orthogonally each other, and a liquid crystal material 36 having an extraordinary index $n_e$ and an ordinary index $n_o$ is injected into the space thereby producing a liquid crystal cell.

It is assumed that no voltage is applied to the liquid crystal between the two transparent conducive films 35 in the layered polarized diffractive filter 30 of this embodiment and linear polarized light having a wavelength λ and being parallel to the direction of the grating of the first diffractive grating 32 is incident into the filter. In the first diffractive grating 32, the transmittance with respect to the incident linear polarized light is determined by a phase difference $\Phi = 2\pi \cdot (n_e - n_s) \cdot d/\lambda$, and in the second diffractive grating 34, the phase difference is substantially zero. When linearly polarized light having a wavelength λ and being perpendicular to the direction of the grating of the first diffractive grating 32 is used as incident light, the phase difference in the first diffractive grating 32 is substantially zero, and a phase difference $\Phi = 2\pi \cdot (n_e - n_s) \cdot d/\lambda$ appears in the second diffractive grating 34.

On the other hand, when a voltage is applied to the liquid crystal, the diffractive grating 32 and the diffractive grating 34 show substantially the same change of phase difference. Accordingly, it is possible to change the phase difference i.e. the transmittance equally in response to all polarization states of incident light.

In the first to third embodiments of the present invention as described above, the diffractive grating or diffractive gratings are formed by a photolithography process. Accordingly, it is possible to form a filter in a specified portion corresponding to a light incident region, and it is easy to change the longitudinal direction, depth, cycle and so on of the grating or gratings depending on regions.

The diffractive filter in any of the first to third embodiments can be installed in an optical system of an optical disk device employing light of, for example, a wavelength bands of 405 nm, 660 nm and 790 nm in combination so as to be used as a wavelength selective filter to transmit light having a wavelength usable for all or a part of the effective region and diffraction-shield light of unused wavelength.

Further, The diffractive filter can be used as a variable filter capable of treating, for example, wavelength bands of 450 nm, 550 nm and 650 nm for blue, green and red in an image display unit or an image reading unit employing light of visible region.

FOURTH EMBODIMENT

Figure 5:
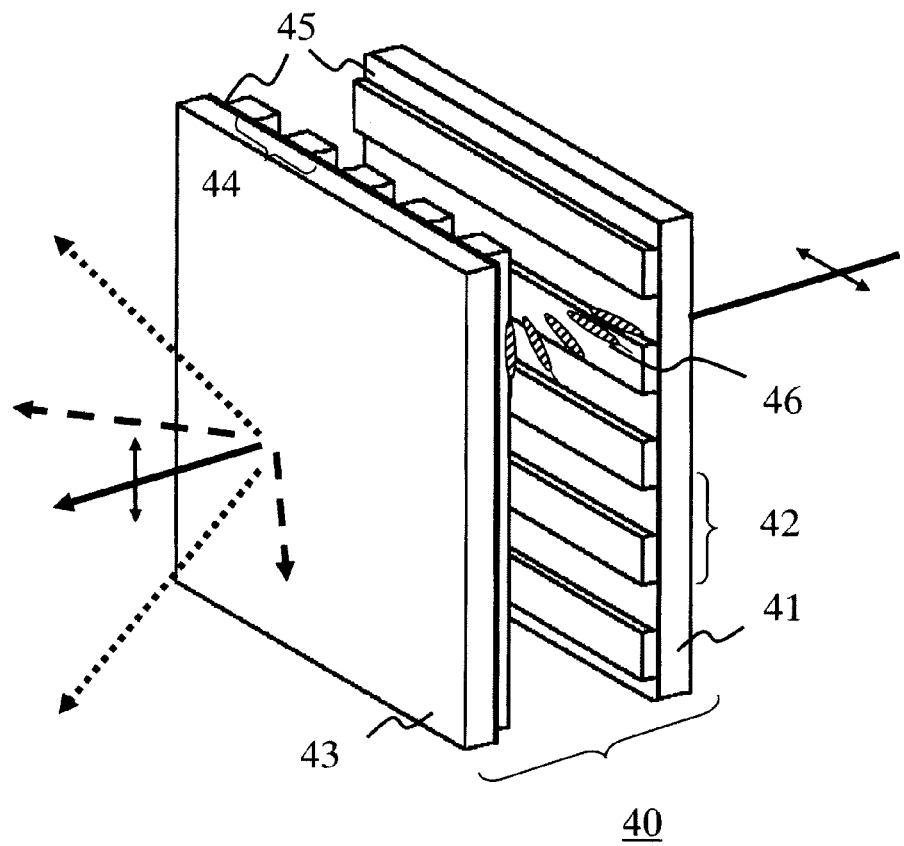
FIG. 5: A perspective view showing a constitutional example of the layered polarized diffractive filter element according to a third embodiment of the present invention

In the following, description will be made as to a layered polarized diffractive filter 40 according to a fourth embodiment of the present invention with reference to FIG. 5.

The layered polarized diffractive filter 40 is the same as the layered polarized diffractive filter 20 (see FIG. 2) according to the second embodiment of the present invention except the following point. The layered polarized diffractive filter 20 comprises the diffractive gratings 22, 24 having substantially the same characteristics whereas in the layered polarized diffractive filter of this embodiment, diffractive gratings 42, 44 having different characteristics are formed on opposing surfaces of transparent substrates 41, 43 respectively so that longitudinal directions of the gratings intersect orthogonally each other.

Namely, in the layered polarized diffractive filter 40 of this embodiment, the diffractive grating 44 having a different structure, i.e., different characteristics from the diffractive grating 42 formed on the transparent substrate 41, is formed on the opposing transparent substrate 43. These diffractive gratings 42, 44 are subjected to an aligning treatment in a direction parallel to the gratings in the same manner as the first embodiment, whereby the alignment of the liquid crystal has a substantially 90° twisted (rotated) structure of alignment in the same manner as the layered polarized diffractive filter 20 of the second embodiment, hence, it serves as an optical rotor.

When no voltage is applied across the two transparent conductive films 45 and when linear polarized light having a wavelength λ and being parallel to a longitudinal direction of a grating is used as incident light, the diffractive grating 42 formed on the transparent substrate 41 provides transmission characteristics under the refractive index $n_s$ of the transparent substrate 41 and the extraordinary index $n_e$ parallel to a longitudinal direction of the grating of the liquid crystal material 46, in the same manner as the first embodiment. The incident linear polarized light rotates by about 90° due to the twisted (rotated) structure of alignment of the liquid crystal between the opposed transparent substrates 41 and 43. As a result, the refractive grating 44 on the opposing transparent substrate 43 also provides transmission characteristics under the transparent substrate 43 and the extraordinary index $n_e$ parallel to a longitudinal direction of the grating of the liquid crystal material 46, in the same manner as the transparent substrate 41.

When a voltage is applied, the phase difference Φ determining the transmittance of transmitted light with respect to linear polarized light incident into the interface of the cyclic concave/convex portions of the liquid crystal cell changes from formula 1 to formula 2 in the same manner as the first embodiment. By selecting properly the depth of grating of the diffractive gratings is 42, 44, phase differences with respect to applied voltages of, for example, $V_0$, $V_1$ and $V_2$ can be rendered to be $2\pi \cdot \lambda_1/\lambda$, $2\pi \cdot \lambda_2/\lambda$ and $2\pi \cdot \lambda_3/\lambda$ in the first diffractive grating and $2 \times (2\pi \cdot \lambda_1/\lambda)$, $2 \times (2\pi \cdot \lambda_2/\lambda)$ and $2 \times (2\pi \cdot \lambda_3/\lambda)$ in the second diffractive grating. In this case, the full width at half maximum of the wavelength of the transmission spectrum in the second diffractive grating at or around a peak wavelength transmitted is narrower than the full width at half maximum of the wavelength of the transmission spectrum in the first diffractive grating, whereby color purity is improved. In such effect, the phase difference of the first diffractive grating may not always be equal to the phase difference of the second diffractive grating but they may be integral multiples of a wavelength to be transmitted. However, the phase difference is preferred to be smaller in order to prevent a reduction of the transmittance or to suppress the number of transmission peaks of a wavelength other than an intended wavelength to be transmitted in a case that the phase difference is increased with integral multiples of the wavelength. Specifically, it is most preferable for the phase differences of the two diffractive gratings to be in a combination of one time and two times of a wavelength to be transmitted, as described above.

In such combination of phase differences, assuring that a voltage $V_0$ is applied across two transparent conductive films 45 for example, and transmittances of light having wavelengths of $\lambda_1$, $\lambda_2$ and $\lambda_3$ at the first diffractive grating 42 are $T^1_1$, $T^1_2$ and $T^1_3$, and transmittances of light having wavelengths of $\lambda_1$, $\lambda_2$ and $\lambda_3$ at the second diffractive grating 44 are $T^2_1$, $T^2_2$ and $T^2_3$. Then, transmission characteristics of the device according to the fourth embodiment are $T^1_1 \times T_1^2$, $T^1_2 \times T_2^2$ and $T^1_3 \times T_3^2$ respectively. By determining properly the transmission characteristics of the first and second diffractive gratings, the extinction ratio and contrasts among the wavelengths $\lambda_1$, $\lambda_2$ and $\lambda_3$ can be improved in comparison with the characteristics obtainable in the first and second embodiments.

Figure 6:
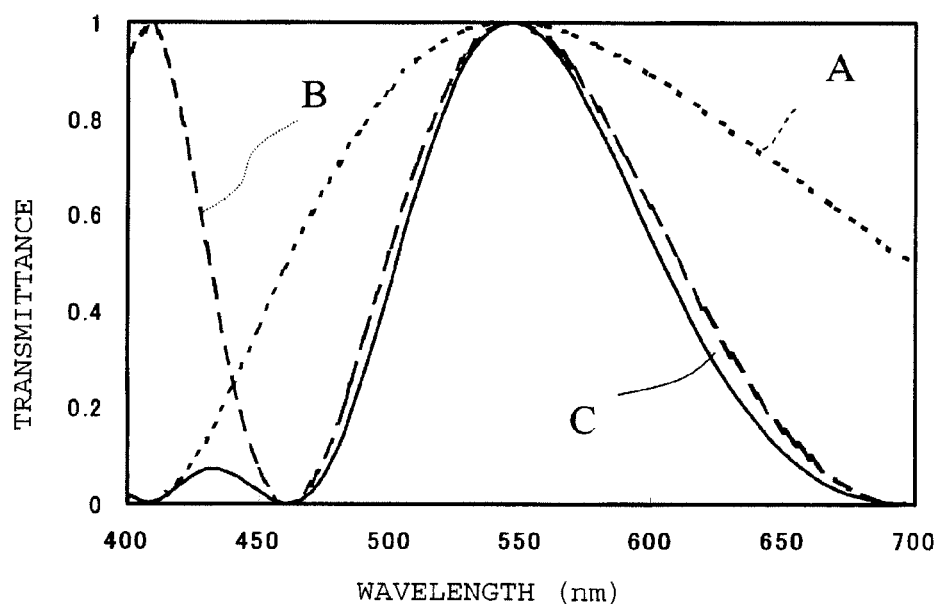
FIG. 6: A graph showing the transmission characteristics of the layered polarized diffractive filter according to the third embodiment of the present invention

FIG. 6 shows an example of the filtering characteristics of this embodiment. In FIG. 6, a dotted line A indicates the transmittance of the first diffractive grating and a broken line B indicates the transmittance of the second diffractive grating respectively. A solid line C indicates the transmittance of a layered structure comprising two diffractive gratings whose longitudinal directions of grating intersect orthogonally. From this figure, it is understood that the full width at half maximum at or around a peak wavelength of transmitted light is made narrow.

EXAMPLE

In the following, some Examples of the present invention will be described specifically.

Example 1

In this Example, a process for producing the layered polarized diffractive filter 10 according to the first embodiment will be described specifically with reference to FIG. 1.

A quartz glass substrate having a refractive index of 1.46 is employed as the transparent substrate 11. A diffractive grating 12 having a grating period of 10 μm and a depth of 2 μm is formed in a surface of the quartz glass substrate by a photolithography process. Then, as the transparent conductive films 14, ITO films of 20 nm thick are formed by sputtering on the diffractive grating 12 and the opposing transparent substrate 13. Then, a polyimide resin is coated on them followed by baking and an aligning treatment by rubbing is conducted so that the direction of alignment is parallel to the direction of the grating 12 to thereby form aligning films (not shown). Then, a peripheral seal (not shown) of epoxy containing glass fiber spacers of 10 μm is formed by printing on a peripheral portion of the transparent substrate 13, and then, this transparent substrate is pressure-bonded by applying heat to the transparent substrate 11 so that the directions of alignment are parallel to each other to thereby form a liquid crystal cell. In this cell, liquid crystal 15 having an extraordinary index of 1.76 and an ordinary index of 1.51 is injected by a vacuum injection is method and sealed to thereby form the laminated polarized diffractive filter 10.

In a state that no voltage is applied across the transparent conductive films 14 of the diffractive filter 10 and that linear polarized light parallel to a longitudinal direction of the grating, passing through a polarizer (not shown) disposed in front of the diffractive filter 10, is incident into this filter, it shows a high transmittance of 85% or more with respect to light having a wavelength of 650 nm. On the other hand, it shows a low transmittance as 15% or less with respect to light having a wavelength of 450 nm.

When a rectangular a.c. voltage having a frequency of 1 kHz is applied across the transparent electrodes 14, the applied voltage being changed, a peak of the wavelength of transmitted light shifts gradually to a side of short wavelength. Under an applied voltage of about 3 V, the filter transmits 85% or more of light having a wavelength of 450 nm, and the transmittance of light having a wavelength of 650 nm is 15% or less. The light intensity of randomly incident polarized light is reduced to half by the polarizer disposed in front of the filter. However, the coefficient of utilization with respect to transmitted wavelength is about 40%.

Example 2

In this Example, a process for producing the layered polarized diffractive filter 30 according to the above-mentioned third embodiment will be described with reference to FIG. 4.

A glass substrate having a refractive index of 1.51 is employed as the transparent substrate 31. A SiON film having a thickness of 2.6 μm and having a composition ratio adjusted so as to be substantially equal to an ordinary index 1.51 of a liquid crystal material used is formed on a surface of the glass substrate by a plasma CVD method. On a surface of the opposing transparent substrate 33, a SiON film having a thickness of 2.6 μm and having a different composition ratio adjusted so as to be substantially equal to an extraordinary index 1.76 of the liquid crystal material used is formed in the same manner as above.

In the both SiON films, diffractive gratings 32, 34 each having a grating period of 25 μm and a depth of 2.6 μm are formed by a photolithography process. As transparent conductive films 35, ITO films having a thickness of 20 nm are formed on the diffractive gratings 32 and 34 by a sputtering method respectively. Then, in order to form aligning films (not shown), a polyimide resin is coated on them followed by baking and an aligning treatment by rubbing is conducted so that the direction of alignment is parallel to a longitudinal direction of the grating with respect to the diffractive grating 32 and the direction of alignment is perpendicular to a longitudinal direction of the grating with respect to the diffractive grating 34.

Then, a peripheral seal (not shown) of epoxy containing glass fiber spacers of 10 μm is formed by printing on a peripheral portion of the transparent substrate 33 and both transparent substrates 31, 33 are pressure-bonded by applying heat so that directions of alignment of opposing gratings are parallel, whereby a liquid crystal cell is formed. In this cell, liquid crystal 36 having an extraordinary index of 1.76 and an ordinary index of 1.51 is injected by a vacuum injection method and sealed to thereby form the layered polarized diffractive filter 30.

The diffractive gratings 32 and 34 act independently on orthogonally intersecting linear polarized light. Accordingly, when polarized light is randomly incident into the liquid crystal cell and when no voltage is applied thereto, it shows a high transmittance as 85% or more with respect to light having a wavelength of 650 nm. On the other hand, it shows a low transmittance as 10% or less with respect to light having a wavelength of 450 nm. When a rectangular a.c. voltage having a frequency of 1 kHz is applied across the two transparent conductive films 35, a peak of the wavelength transmitted shifts gradually to a side of short wavelength. Under an applied voltage of about 2.5 V, the filter transmits 85% or more of light having a wavelength of 450 nm and the transmittance of light having a wavelength of 650 nm is 10% or less. Since there is no polarizer disposed in front of the filter unlike Example 1, the coefficient of utilization with respect to transmitted wavelength is about 80%.

Example 3

In this Example, a process for producing the layered polarized diffractive filter 40 of the above-mentioned fourth embodiment will be described specifically with reference to FIG. 5.

A glass substrate having a refractive index of 1.51 is employed as the transparent substrate 41. As the transparent conductive film 45, an ITO film having a thickness of 20 nm is formed uniformly on a surface of the glass substrate by a sputtering method. On the transparent conductive film 45, a $Ta_2O_5$ film having a refractive index of about 2.2 and a thickness of 1.2 μm is formed by a vacuum deposition method. On the surface of the transparent substrate 43 opposing to the transparent conducive film 45, an ITO film having a thickness of 20 nm and a $Ta_2O_5$ film having a refractive index of about 2.2 and a thickness of 2.4 μm are formed, as the transparent conductive film 45 sequentially as well.

In the both $Ta_2O_5$ films, a diffractive grating 42 having a grating period of 2 μm and a depth of 1.2 μm and a diffractive grating 44 having a grating period of 2 μm and a depth of 2.4 μm are formed respectively by a photolithography method. Then, a polyvinyl cinnamate resin to align liquid crystal in a polarization direction of ultraviolet light irradiated is coated followed by baking and an aligning treatment by irradiating polarized ultraviolet light is conducted to the coated film so that the direction of alignment is parallel to a longitudinal direction of the grating with respect either to the diffractive grating 42 or the diffractive grating 44 to thereby form aligning films (not shown).

Then, a peripheral seal (not shown) of epoxy containing glass fiber spacers of 10 μm is printed on a peripheral portion of the transparent substrate 43 and these transparent substrates 41, 43 are pressure-bonded by applying heat so that the longitudinal direction of the opposing gratings and the direction of alignment intersect orthogonally, whereby a liquid crystal cell is formed. In the cell, liquid crystal 46 having an extraordinary index of 1.76 and an ordinary index of 1.51 is injected by a vacuum injection method and sealed to thereby form the layered polarized diffractive filter 40.

When linear polarized light having a polarization direction parallel to a longitudinal direction of the grating, which has passed through a polarizer (not shown) disposed in front of the layered polarized diffractive filter 40 is incident thereto in a state that no voltage is applied across the two transparent conductive films 45, it shows a high transmittance as 80% or more with respect to light having a wavelength of 450 nm. On the other hand, it shows a low transmittance as 10% or less with respect to light having wavelengths of 550 nm and 650 nm.

When a rectangular a.c. voltage having a frequency of 1 kHz is applied across the two transparent electrodes 45, the applied voltage being changed, the peak of the wavelength transmitted shifts gradually to a side of short wavelength. Under an applied voltage of about 3 V, it transmits 80% or more of light having a wavelength of 550 nm and the transmittance of light of wavelengths of 450 nm and 650 nm is 10% or less. Further, when a higher voltage is applied to, it transmits 80% or more of light having a wavelength of 650 nm and the transmittance of light having wavelengths of 450 nm and 550 nm is 10% or less.

The present invention is not limited to the above-mentioned Examples and can be achieved in various modes unless they deviate from the sprit of the present invention.

INDUSTRIAL APPLICABILITY

In the present invention, the wavelength to be transmitted or diffraction-shielded can be changed. Accordingly, the diffractive filter of the present invention can be employed in an optical head device for recording or reading data to an optical disk using a large number of wavelengths or can be used as a part of an image displaying device or an image processing device using a wavelength range covering the whole visible light region, whereby a device of simple, smaller number of component elements, small-sized and reduced weight can be obtained.

The entire disclosure of Japanese Patent Application No. 2004-221265 filed on Jul. 29, 2004 including specification, claims, drawings and summary is incorporated herein by reference in its entirety.

What is claimed is:

1. A polarized diffractive filter, comprising:
two transparent substrates;
cyclic concave/convex portions formed as a diffractive grating on or in at least one of said two transparent substrates; and
each substrate comprising a transparent conductive film which is present a) on said diffractive grating, or b) below said diffractive grating or c) on said substrate if no diffractive grating is present;
wherein the concave portions are filled with an optical material;
wherein the concave/convex portions comprise an isotropic material; and
wherein the optical material filled in the concave portions comprises a liquid crystal material;
wherein said polarized diffractive filter is capable of receiving light having at least two different peak wavelengths and changing a wavelength to be diffracted by applying a voltage across the transparent conductive films to change a wavelength to be transmitted;
wherein said polarized diffractive filter is capable of changing a wavelength having a phase difference φ of 2π or 4π according to an applied voltage,
wherein the diffractive grating has the phase difference φ changing from $\phi=2\pi\cdot(ne-ns)\cdot d/\lambda$ in a non-voltage application time to $\phi=2\pi\cdot(no-ns)\cdot d/\lambda$ in a voltage application time,
wherein the cyclic concave/convex portions of the diffractive grating have a depth d, the liquid crystal material has an extraordinary refractive index ne and an ordinary refractive index no, and the light has a wavelength λ.

2. The polarized diffractive filter according to claim 1, wherein the directions of alignment of axis of liquid crystal molecules indicating an extraordinary index of the liquid crystal material are parallel to a longitudinal direction of the diffractive grating in the vicinity of the diffractive grating.

3. The polarized diffractive filter according to claim 1, wherein the concave/convex portions constituting the diffractive grating comprise a thin film formed on the transparent substrate.

4. The polarized diffractive filter according to claim 1, which comprises one transparent substrate having said cyclic concave/convex portions formed as a diffractive grating.

5. The polarized diffractive filter according to claim 4, wherein one transparent conductive film is present on the concave/convex portions formed as the diffractive grating on the one transparent substrate, and the other transparent conductive film is present on the other transparent substrate having no diffractive grating.

6. The polarized diffractive filter according to claim 1, which comprises two transparent substrates, each having said cyclic concave/convex portions formed as a diffractive grating.

7. The polarized diffractive filter according to claim 6, wherein the diffractive gratings are layered on opposing surfaces of the two transparent substrates so that longitudinal directions of the diffractive gratings orthogonally intersect each other.

8. The polarized diffractive filter according to claim 7, wherein the transparent conductive film is present on the concave/convex portions formed as the diffractive grating of each of the two transparent substrates.

9. The polarized diffractive filter according to claim 7, wherein liquid crystal molecules of the liquid crystal material have a substantially 90° twisted structure between the two transparent substrate during the non-voltage application time.

10. The polarized diffractive filter according to claim 6, wherein the transparent conductive films are present on the two transparent substrates, and the convex portions are formed on the transparent conductive films.

11. The polarized diffractive filter according to claim 10, wherein liquid crystal molecules of the liquid crystal material have a substantially 90° twisted structure between the two transparent substrate during the non-voltage application time.

12. The polarized diffractive filter according to claim 1, wherein said transparent conductive film is present on said diffractive grating.

13. The polarized diffractive filter according to claim 1, wherein said transparent conductive film is present below said diffractive grating.

14. The polarized diffractive filter according to claim 1, wherein said transparent conductive film is present on said substrate if no diffractive grating is present.

* * * * *